(12) United States Patent
Kottoor et al.

(10) Patent No.: US 9,235,870 B2
(45) Date of Patent: Jan. 12, 2016

(54) SYSTEM AND METHOD FOR DOCUMENTING EVIDENCE

(71) Applicant: SCENEDOC INC., Milton (CA)

(72) Inventors: Alex Kottoor, Milton (CA); Adrian Markie Bubalo, Brampton (CA); Kamil Sebastian Salagan, Mississauga (CA)

(73) Assignee: SCENEDOC INC., Milton, Ontario ( * ) Notice: Subject to any disclaimer, the term of this patent is extended or adjusted under 35 U.S.C. 154(b) by 0 days.

(21) Appl. No.: 13/705,330

(22) Filed: Dec. 5, 2012

(65) Prior Publication Data

US 2014/0156657 A1   Jun. 5, 2014

(51) Int. Cl.
| | |
|---|---|
| G06F 17/30 | (2006.01) |
| G06F 7/00 | (2006.01) |
| G06Q 50/26 | (2012.01) |
| G06Q 10/10 | (2012.01) |

(52) U.S. Cl.
CPC ............... *G06Q 50/26* (2013.01); *G06Q 10/10* (2013.01); *G06F 17/30* (2013.01)

(58) Field of Classification Search
CPC ............ G06F 17/30864; G06F 17/30011; G06F 17/30867; G06Q 10/10; G06Q 30/02
USPC .................. 707/736; 235/385; 705/8
See application file for complete search history.

(56) References Cited

U.S. PATENT DOCUMENTS

| | | | |
|---|---|---|---|
| 7,309,010 B2 * | 12/2007 | Stopperan et al. ............ 235/385 |
| 8,068,023 B2 | 11/2011 | Dulin et al. | |
| 8,576,283 B1 * | 11/2013 | Foster ................ G06Q 10/0631 348/143 |
| 9,123,002 B2 * | 9/2015 | Shikhman ............... G06Q 10/06 |
| 2009/0089361 A1 * | 4/2009 | Womack .................. G06F 21/64 709/202 |
| 2009/0171961 A1 * | 7/2009 | Fredrickson ....................... 707/7 |
| 2009/0271238 A1 * | 10/2009 | Himley ................. G06Q 10/10 705/325 |
| 2012/0318866 A1 * | 12/2012 | McIntyre ............... G06Q 10/10 235/385 |

OTHER PUBLICATIONS

James, S. H., & Nordby, J. J. (2009). Forensic science: An introduction to scientific and investigative techniques. Boca Raton, FL: CRC Press/Taylor & Francis Group. Chapter 8.*

Carrier, Brian, Spafford, Eugene H. Getting Physical with the Digital Investigation Process. International Journal of Digital Evidence. vol. 2, 2003.*

Deister. "Axional Mobile PUD", website: www.deister.net/en/solutions/mobility/ax-mobile-pud/.

(Continued)

*Primary Examiner* — Usmaan Saeed
*Assistant Examiner* — Raquel Perez-Arroyo
(74) *Attorney, Agent, or Firm* — Bhole IP Law; Anil Bhole

(57) ABSTRACT

A system and method for documenting evidence. Investigators are provided a mobile client device enabling them to document evidence directly at a crime scene. Documentation is provided to an evidence gathering module which collects the documentation and stores it to an evidence database. Once the investigation is complete, a chain of custody document is generated. Documentation is time and date stamped and each documented item of evidence is linked to the particular investigator that documented it. The mobile client device provides automated location and environmental data, reducing error and overhead for the investigator.

28 Claims, 8 Drawing Sheets

(56) References Cited

OTHER PUBLICATIONS

Mian, International Search Report in respect of PCT/CA2013/050933, Canadian Intellectual Property Office, Gatineau, Canada.

Mian, Written Opinion of the International Searching Authority in respect of PCT/CA2013/050933, Canadian Intellectual Property Office, Gatineau, Canada.

* cited by examiner

| | |
|---|---|
| CASE NUMBER | |
| CASE TITLE | |
| LOCATION | |
| LEAD INVESTIGATOR | |
| OTHER INVESTIGATORS | |

FIG. 4

| | |
|---|---|
| CASE NUMBER | |
| LOCATION | |
| INVESTIGATOR | |
| TIME/DATE OF ARRIVAL | |
| TIME/DATE OF DEPARTURE | |
| ENVIRONMENTAL CONDITIONS | |
| COMMENTS | |

| PROPERTY RECEIPT ||||
|---|---|---|---|
| RECEIVED/SEIZED FROM: || DATE AND TIME RECEIPT: | FILE NUMBER: |
| RECEIVED/SEIZED BY: || LOCATION: ||
| ITEM NO. | DESCRIPTION: |||
| I hereby certify that the above is a correct and complete inventory of items (received/seized by)(transfered from) the undersigned officer at the above stated date, time and place, and that the said inventory was made in the presence of: ||| OFFICER: |
| ^ ||| WITNESS: |
| I hereby acknowledge receipt of a copy of this inventory and that it is true and complete: ||| SIGNATURE: |

FORM 3-155 (9/81)

FIG. 10

SYSTEM AND METHOD FOR DOCUMENTING EVIDENCE

FIELD OF THE INVENTION

The present invention relates generally to the documentation of evidence.

DESCRIPTION OF THE PRIOR ART

Crime solving relies heavily on evidence gathering. Evidence includes items found at and characteristics related to the commission of a crime. Proper gathering of evidence includes documenting, collecting and preserving the evidence for later use, such as at trial, which requires the gathering process to be accurate and reliable.

Appropriate documentation, collection and preservation of evidence are vital, but collection of evidence at crime scenes is difficult. Often times, crime scenes can be in hazardous, disorganized, and undesirable locations, and they can be visited during times of poor environmental conditions. Nevertheless, any failure to properly collect and document evidence gathered at a crime scene can lead to harsh consequences, including the failure to determine the cause of a crime or the acquittal of a guilty party.

Crime scene investigation (CSI) requires a skill set that is not entirely intuitive. CSI experts have significant skill and expertise gathered over the course of years. In some cases, highly qualified law enforcement officers are called upon to conduct CSI, however they may not have recent CSI experience, leading to the utilization of improper CSI techniques.

CSI typically consists of a number of distinct steps, some of which introduce redundancies, including securing the crime scene, evaluating the safety of officers who will be at the crime scene, an initial walkthrough of the crime scene by several officers, identification and documentation of evidence, photographing evidence, mapping the crime scene, collection and preservation of the evidence, and creating a chain of custody (CoC). The CoC reflects the possession of each piece of evidence and must be maintained with high accuracy in order for the evidence to be most useful. It is only upon the application of appropriate CSI techniques that the evidence may be relied upon to create and investigate hypotheses of what occurred at the crime scene.

It is an object of the present invention to obviate or mitigate at least one of the above disadvantages.

SUMMARY OF THE INVENTION

In one aspect, a system for documenting evidence is provided, the system comprising an evidence gathering module, comprising a processor, enabling at least one investigator to document at least one item of evidence for a case and provide the documentation to an evidence database for storage, the evidence gathering module further enabling the generation of a chain of custody form identifying the documented items of evidence.

In another aspect, a method for documenting evidence is provided, the method comprising enabling, by a processor: (a) documenting, by at least one investigator, of at least one item of evidence for a case; (b) storing the documentation on an evidence database; and (c) generating a chain of custody form identifying the documented items of evidence.

BRIEF DESCRIPTION OF THE DRAWINGS

The features of the invention will become more apparent in the following detailed description in which reference is made to the appended drawings wherein:

FIG. 4 is an exemplary case form;

FIG. 5 is an exemplary case selection screen;

FIG. 9A is a first part of an exemplary chain of custody form;

FIG. 9B is a second part of an exemplary chain of custody form; and

FIG. 10 is an exemplary property receipt form.

DESCRIPTION

Figure 1:
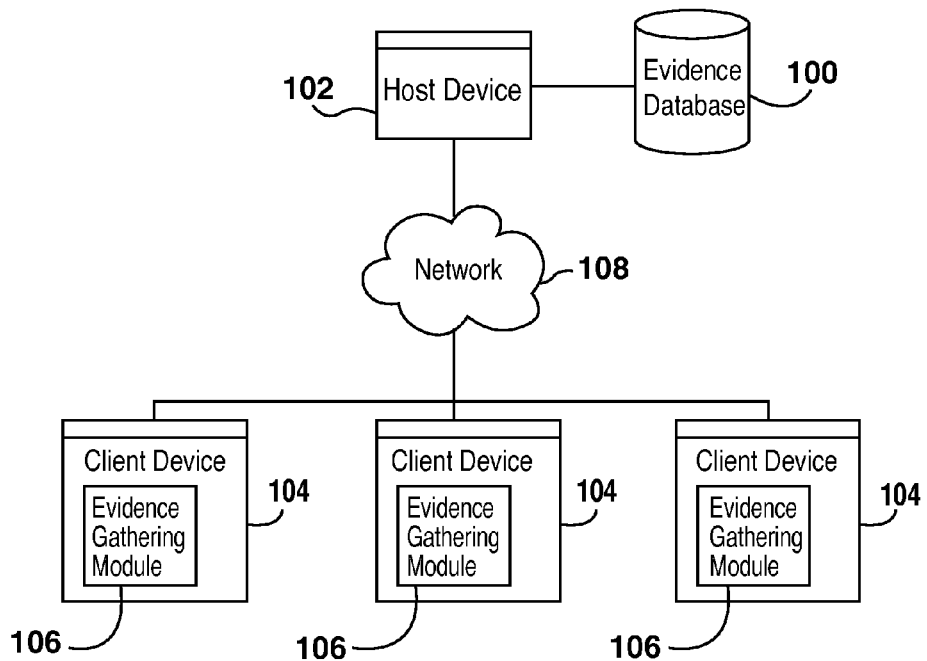
FIG. 1 is an architecture diagram of a network connected system for documenting evidence.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

A system and method for documenting evidence is provided. The system enables one or more investigators to collect and document evidence and to create a CoC for a crime scene. The CoC identifies evidence gathered by one or more investigators at the crime scene. The CoC is generated using information collected during the evidence documentation process.

It will be appreciated that the term "crime" is to be non-limiting and is only used herein to assist a reader to understand one scenario for using the system, however the system is also useful for documenting items for other purposes, such as to conduct an inventory audit, investigate a natural event, or otherwise document items and/or data. For the foregoing reason, the terms "supervisor", "investigator" and "lead investigator" are used herein illustratively and in a non-limiting manner. For example, the "investigator" may instead be an observer or documentor.

Referring now to FIG. 1, an evidence database (100) stores information relating to evidence observed at a crime scene. The evidence database (100) is accessible by a host device (102), which is further accessible over a network (108) by evidence gathering modules (106) each executable by one of a plurality of client devices (104). In this implementation, client devices (104) may be deployed in the crime scene while the host device (102) may be centrally located, for example in a data centre or near the evidence database (100), such as at a police station or headquarters. In other implementations, evidence gathering modules (106) may access the evidence database (100) directly and the host device (102) may be omitted or simply serve as a terminal for viewing data stored on the evidence database (100). In further implementations, the evidence database (100) may be integrated on a client device (104) and the host again may again be omitted or simply serve as a terminal for viewing data stored on the evidence database (100). In a specific implementation, the client device (104) embodies the evidence database (100) and is a standalone device implementing the following functionality. An analytic engine (110) may also be provided and may be linked to the host device (102) or any of the client devices (104).

In a particular implementation, the evidence database stores case records corresponding to case information, evidence records corresponding to evidence gathered in a case, and CoC and property receipt forms generated for cases. Case records may comprise, for example, lead investigator identifier, crime scene location, time and date of arrival, time and date of departure, environmental conditions, comments and mobile device identifiers. Evidence records may comprise, for example, evidence type, images, location, comments, annotations, which investigator identified the item, seizure tag number and the date/time it was documented. The information is gathered in the course of crime scene investigation in accordance with the techniques described herein.

Generally, the client devices (104) are used by CSI investigators at a crime scene to document the crime scene and the evidence at the time the evidence is observed. The documentation is transmitted to the host device (102), which automatically, or by partial human intervention, records the documentation on the evidence database (100). The documentation may comprise environmental conditions, locations, descriptions, images, video, audio and other media. Furthermore, the documentation pertaining to the crime scene and evidence may be associated with a particular CSI investigator and associated with a particular time stamp, providing information suitable for generating a CoC.

Figure 2:
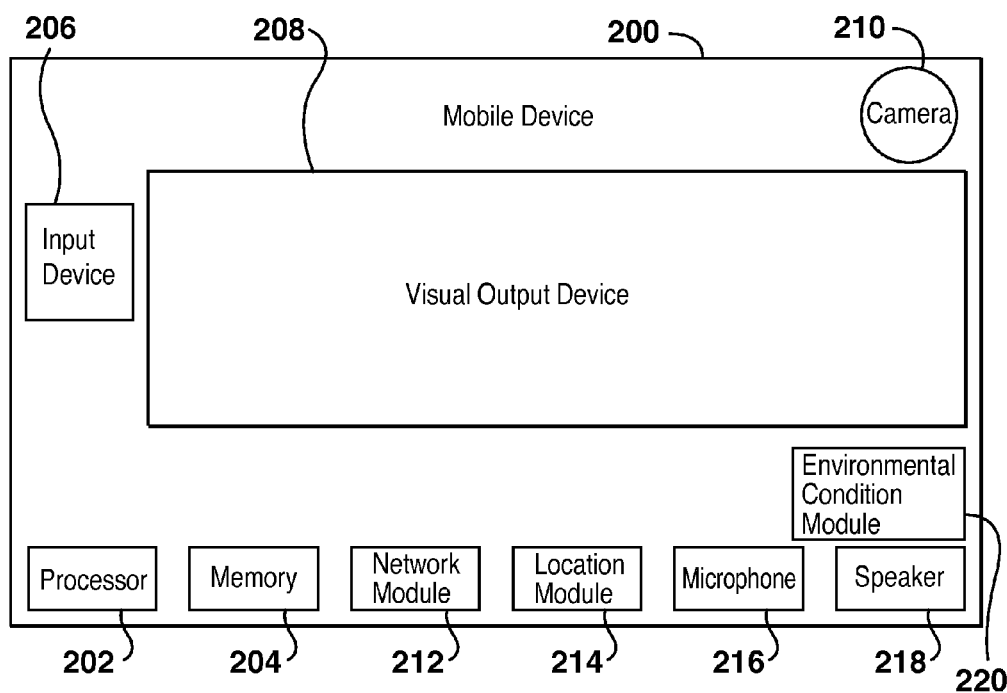
FIG. 2 is an architecture diagram of a client device for documenting evidence.

Referring now to FIG. 2, an exemplary client device (104) is implemented by a mobile device (200). The mobile device may be a tablet computer, smartphone, laptop, handheld computer, etc. The mobile device (200) may comprise a processor (202), memory (204), input device (206), visual output device (208), camera (210), network module (212) and location module (214). Preferably, the input device and visual output device are provided by a touchscreen interface. Optionally, the mobile device (200) further comprises a microphone (216) and speaker (218). Optionally, the mobile device further comprises an environmental condition module (220).

The network module may comprise a wired or, preferably, wireless network connection to a network linked to the host device. Preferably, the network module further links the mobile device to the internet, for example by use of IEEE 802.11, GPRS, 3G, 4G, LTE, or other suitable protocol. In example implementations, each device described herein is linked to a public or private network through which the internet may be accessed.

The location module enables the mobile device to determine its location. Exemplary techniques comprise individual or blended GPS, Wifi localization, triangulation of any kind, sonar, or any other suitable technique. In one example of triangulation, three transmitters in communication with the location module may be disposed at three locations at or near a crime scene, enabling the location module to determine the location of the mobile device using a triangulation technique known in the art. In another example, the camera (210) and suitable software executed by the mobile device (200) may be used to determine distances to three landmarks at or near a crime scene.

The memory comprises computer instructions which, when executed by the processor, provide the functionality of the evidence gathering module (106). The memory may further comprise device specific information, such as a mobile device identifier. The memory may further serve as a temporary or persistent memory for any of the data provided to the mobile device prior to transmission to the evidence database (e.g., as a cache).

The environmental condition module (220) may be operable to determine environmental (weather) conditions such as temperature, pressure, humidity and wind speed. In conjunction with the camera and a suitable image processing technique, the environmental condition module (220) may further be operable to determine whether it is presently sunny, overcast, raining, etc.

A user may initiate execution of the evidence gathering module (106) via a pre-existing interface provided by the mobile device (200), such as using the operating system interface of the mobile device (200).

The host device may be provided by a similarly configured mobile device, or by a computer such as a desktop or server computer, or by another suitable computing device.

Figure 3:
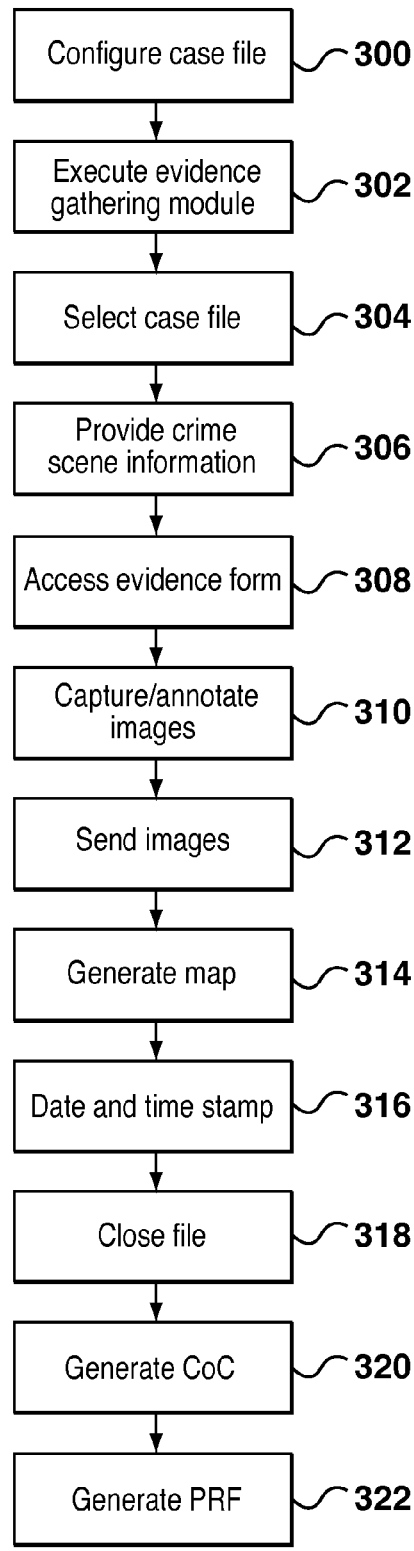
FIG. 3 is a flowchart of one example method of documenting evidence.

Referring to FIG. 3, an example of documenting evidence is now described. It shall be appreciated, as stated earlier, that the functionality of the host device could be provided by any one or more of the client devices.

At block 300, a user of the host device (102), referred to herein as a supervisor, configures a case file in the evidence database. Generally, there is a one-to-one correspondence of crime scenes to case files. A case file may be identified by case number (or other identifier), case title, and/or location of the crime scene. The supervisor may further configure the case file to be accessible by one or more other users, referred to herein as investigators, of which the case file may be configured to associate one as the lead investigator. An example of a case file configuration screen is shown in FIG. 4.

Each investigator attending at a crime scene is provided with a client device. Optionally, investigators are provided with login credentials to identify which investigator is using which client device and, furthermore, to provide a higher level of security. At block 302, each investigator executes the evidence gathering module (106) and, optionally, provides login credentials, following which the visual output device may display to the investigator a case selection screen, an example of which is shown in FIG. 5, enabling the user to select a case file for which to gather evidence. It will be appreciated that only one investigator is required for using the system as the investigator could serve as supervisor and lead investigator. In such a circumstance, the information requested in FIGS. 4 and 5 could be requested in a single form.

Upon selecting a case file, at block 304, a case form is displayed to the investigator on the visual output device. For the lead investigator, the case form requests the lead investigator to input, using the input device, crime scene information. Crime scene information may, for example, comprise lead investigator identifier, crime scene location, time and date of arrival, time and date of departure, environmental conditions and comments. The mobile device identifier may also be associated with the case form, providing traceability. Optionally, the case form enables the investigator to provide audio or other media, for example using the microphone and using the speaker for playback confirmation.

The client device may automatically provide certain of the requested crime scene information at block 306. For example, the client device may obtain the location using its location module; determine time and date of arrival using a system clock of the client device, a system clock of the host device obtained over the network or another clock obtained over the network; and determine environmental conditions obtained from an environmental source over the network (e.g., a weather website) or the environmental condition module. The lead investigator identifier may be automatically provided as well, since this investigator may have been previously appointed by the supervisor, and since the lead investigator may have provided login credentials.

It will be appreciated that any automated action described herein may be replaced or augmented by manual intervention of the investigator, lead investigator or supervisor, such as by providing an opportunity to review, modify and approve entry of automatically-generated data.

The time and date of departure may be provided at the end of the investigation and may be obtained automatically using a similar technique as used for the time and date of arrival. Comments may be manually provided by the lead investigator at the time of arrival and/or departure and/or anytime in between.

The case form may optionally enable the lead investigator to identify the locations of a plurality of landmarks that may be used for evidence location determination. For example, the location of each item of evidence may be determined by a distance measurement to three separated landmarks, which enables triangulation for the purpose of creating a crime scene map. Typically, the manual triangulation measurements are taken from three previously agreed-upon points in proximity of the crime scene, such as trees, rocks or other landmarks. The positions of the landmarks are required in order for the triangulation to have meaning.

The case form may further enable the lead investigator to append photographs of the general crime scene to the case file. The case form may comprise a command to launch the camera, selection of which may launch a canvas to capture and annotate photos. Photo capture and annotation is described further below. The case form may enable the lead investigator to capture a predetermined number or any other number of photos of the crime scene.

Figure 6:
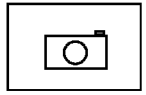
FIG. 6 is an exemplary evidence form.

Upon completion of the case form by the lead investigator, each investigator may be provided with access to an evidence form at block 308, an example of which is shown in FIG. 6. An evidence form is completed for each item of gathered evidence at the crime scene. Typically, in crime scene investigation, each item of evidence is identified by a placard placed in proximity of the evidence. The evidence form enables the investigator to input a placard identifier (e.g., number or symbol, such as a letter, for example) for each item. Alternatively, the evidence database can track the placard identifier already assigned at a crime scene by a supervisor at the host device and, upon launching each new evidence form, assign a new placard identifier to the item. This approach eliminates the opportunity of using a placard identifier more than once, which is particularly beneficial where a plurality of investigators are attending at a crime scene.

The investigator may further input the placard identifier by scanning a tokenized placard using the camera with suitable token recognition software. For example, each placard may have printed thereon a token, such as barcode or block letter, which can be scanned and recognized by the mobile device using the camera. The investigator may simply point the camera at the placard to obtain the placard identifier for input to the evidence form. This approach also eliminates the opportunity of using a placard identifier more than once, which is particularly beneficial where a plurality of investigators are attending at a crime scene.

In addition to the placard identifier, the evidence may be identified by a short investigator-defined description, location of the item in the crime scene, investigator identifier and comments. The evidence may also be classified and, if it is evidence that may be seized, associated with a seizure tag identifier. Comments may relate to the state, characteristics or condition of the evidence and surrounding area.

The item location may be automatically determined by the location module. The investigator may be requested to trigger an automated location determination since the mobile device is preferably placed very nearby the evidence at the time the location is to be determined. Alternatively, three manual triangulation measurements may be input to the evidence form. Alternatively still, the network module may communicate with a mapping source (such as Google™ Maps™, for example) to display a map of the crime scene to the investigator, who can select the location directly on the map, for example by touching the touchscreen in the location on the map.

The investigator identifier may be automatically provided based on the investigator associated with the particular mobile device being used to input the evidence being gathered.

The evidence type may be selected from a configured list. Table 1 lists exemplary evidence types for a typical crime scene. A selection for "other" may be provided to enable the investigator to input an unlisted evidence type. The configured list may be modified by the supervisor on the host device, which may deploy the configured list to the client devices.

TABLE 1

| Evidence Type | Officer Safety | Collection | Preservation |
| --- | --- | --- | --- |
| Ammunition |  | Collect in paper envelope | Store dry |
| Animal remains | Blood borne pathogens | Collect in plastic bag | Freeze |
| Arrows - dry |  | Collect in paper envelope | Store dry |
| Arrows - wet |  | Collect in plastic bag | Freeze |
| Art Object |  | Collect in plastic envelope | Store dry |
| Axe |  | Collect in paper bag | Freeze |
| Bite marks |  | Photograph with specialized light sources and with a L shaped ruler | See collection |

TABLE 1-continued

| Evidence Type | Officer Safety | Collection | Preservation |
|---|---|---|---|
| Blood spot - dried | Blood borne pathogens | Collect sample with clean razor blade and place in paper envelope | Freeze |
| Blood spot - wet | Blood borne pathogens | Collect blood with a clean, Q-tip | Air dry first then freeze |
| Bones | | Collect in paper envelope | Freeze |
| Burn patterns | | Photograph with specialized light sources | See collection |
| Cane or walking stick | | Collect in plastic envelope | Store dry |
| Carcass - complete | Pathogens, parasites, fleas | Collect in plastic bag | Freeze |
| Carcass - partial | Pathogens, parasites, fleas | Collect in plastic bag | Freeze |
| Carcass, oiled | | Collect in paper envelope first and then place in plastic bag. | Freeze |
| Cartridge, spent | | Place in paper envelope separately | Store dry |
| Cartridge, spent with latent prints | | Collect with the aid of a pencil and immobilize | Store dry |
| Carving | | Collect in plastic envelope | Store dry |
| Clothing | | Collect in paper envelope | Freeze |
| Detonating/Deflagrating material | Potentially hazardous | CALL SPECIALIZED UNIT | See collection |
| Digital, camera | | Collect in paper envelope | Store dry |
| Digital, cell phone | | Wrap in 3 layers of foil/foil bag | Store dry |
| Digital, computer | | Wrap in 3 layers of foil/foil bag | Store dry |
| Digital, GPS | | Wrap in 3 layers of foil/foil bag | Store dry |
| Digital, PDA | | Wrap in 3 layers of foil/foil bag | Store dry |
| Document, handwritten | | Collect in paper envelope do not write on envelope after the item(s) are in them | Store dry |
| Document, bank notes | | Collect in paper envelope | Store dry |
| Document, receipt | | Collect in paper envelope | Store dry |
| Document, signed | | Collect in paper envelope | Store dry |
| Document, typed | | Collect in paper envelope | Store dry |
| Fabrics | | Collect in paper bag | Store dry |
| Feather | | Collect in paper envelope | Store dry |
| Fire debris remains | | Collect in paper envelope first and then place in plastic bag. | Freeze |
| Firearm | Hazardous if firearm is loaded | Make sure the chamber and magazine are empty taking care to preserve any latent prints | Store dry |
| Frozen meat | | Cut about ½ inch cube and place in plastic bag | Freeze |
| Fur coat | | Collect in plastic bag | Store dry |
| Garment | | Collect in paper envelope | Freeze |
| Glass fragments | | Collect in paper bag | Store dry |
| Glove | | Collect in paper bag | Freeze |
| Hair | | Collect in paper envelope | Store dry |
| Hat or head covering | | Collect in paper envelope | Freeze |
| Horn | | Collect in paper envelope | Store dry |
| Human body | Pathogens | Collect in plastic bag | Freeze |
| Human remains | Pathogens | Collect in plastic bag | Freeze |
| Ivory | | Collect in paper envelope | Store dry |
| Knife | | Collect in paper bag | Freeze |
| Latent prints on documents, tape bottles, egg shells, etc. | Pathogens If the print is in blood | Collect without touching and immobilize if a bloody print, air dry package in paper | Store dry |
| Leather - tanned | | Collect in plastic bag | Store dry |
| Liquids | Toxic hazardous. If chemical smell or dead flies, then material is TOXIC | Collect less than 1 ml in glass tubes CALL LAB | Freeze |
| Paint fragments | | Collect in paper bag | Store dry |
| Plant debris | | Collect in paper bag | Store dry |
| Poison, suspected | Toxic hazardous. If chemical smell or dead flies, then material is TOXIC | Collect less than 1 ml in plastic tubes CALL LAB | Freeze |
| Powders | Toxic hazardous. If chemical smell or dead flies, then material is TOXIC | Collect in plastic bag | Store dry |
| Rope | | Collect in paper bag | Store dry |
| Saliva - wet | Potentially pathogens | Collect with a clean, Q-tip | Air dry first then freeze |
| Semen - wet | Potentially pathogens | Collect with a clean, Q-tip | Dry first then freeze |

TABLE 1-continued

| Evidence Type | Officer Safety | Collection | Preservation |
|---|---|---|---|
| Shells | | Collect in paper envelope | Store dry |
| Shoes - dry | | Collect in plastic envelope | Store dry |
| Shoes - wet | | Collect in paper bag | Freeze |
| Shoe impressions | | Photograph with camera and light source at 90 degrees of impression with L shaped ruler and cast prints | See collection |
| Skeletal Remain - Animal | | Collect in paper envelope | Freeze |
| Skeletal Remain - Human | | Collect in paper envelope | Freeze |
| Skin - raw | Potentially pathogens | Collect in plastic bag | Freeze |
| Skin - untanned | Potentially pathogens | Collect in plastic bag | Freeze |
| Skin with fur - dry | | Collect in plastic envelope | Store dry |
| Skin with fur - wet | | Collect in paper bag | Freeze |
| Skin without fur - dry | | Collect in plastic envelope | Store dry |
| Skin without fur - wet | | Collect in paper bag | Freeze |
| Skull - Animal | | Collect in paper envelope | Freeze |
| Skull - Human | | Collect in paper envelope | Freeze |
| Snake Head | Potentially hazardous: venom still active | Collect in plastic bag | Freeze |
| Snake Skin - tanned | | Collect in plastic bag | Store dry |
| Tablets | Toxic hazardous | Collect in plastic bag | Store dry |
| Teeth - dry | | Collect in plastic bag | Store dry |
| Teeth - wet | Pathogens | Collect in paper envelope | Freeze |
| Textile fibers & threads | | Collect in paper bag | Store dry |
| Tire marks | | Photograph with specialized camera and light source at 90 degrees of impression with L shaped ruler and cast prints | See collection |
| Tissue samples | Pathogens | Cut about ½ inch cube and place in plastic bag | Freeze |

The evidence list may be augmented by instructional information in respect of the handling of evidence. For example, the instructional information (examples of which are shown in Table 1 in the columns "Officer Safety", "Collection" and "Preservation") may be step by step instruction of how to preserve and package evidence such as a bullet casing, or fingerprint, to minimize the potential of damaging or compromising the value of the evidence.

For particular evidence types, for example particularly hazardous items, a notification can be displayed to the investigator upon selection of evidence type. Furthermore, the investigator's client device may communicate a notification to the host device, which may further be disseminated to the other client devices to display a notification and to third parties as required. In a particular example, if one investigator selects an evidence type of toxin, pathogen or explosive evidence, a notification may be displayed on all client devices advising investigators to evacuate the crime scene. Notification may further be disseminated to third parties such as hazardous materials team, ambulance and bomb squad, as appropriate, advising them to attend at the crime scene.

The seizure tag identifier may be manually or automatically input or automatically generated, in a similar manner as for placard identifiers. In certain cases, the seizure identifiers are preprinted on seizure tags and bags (but can be preconfigured by the supervisor on the host device) for the case to ensure correct entry).

Figure 7:
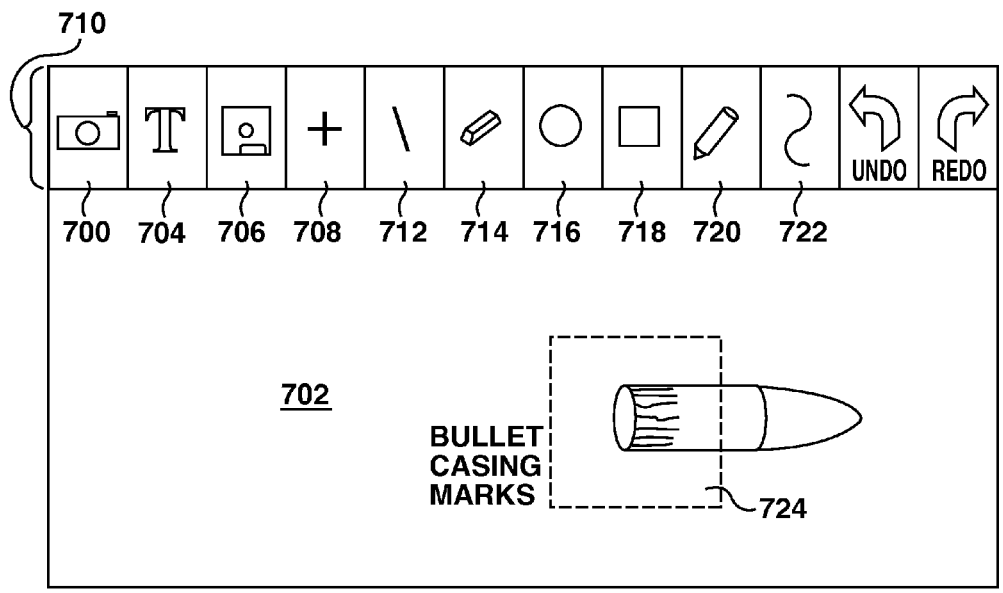
FIG. 7 is an exemplary canvas.

The evidence form further comprises an image capture command which may be selected by the investigator. The image capture command enables the investigator to capture one or more images of an item of evidence using the camera at block 310. Upon selecting the image capture command, the evidence gathering module provides the investigator with a canvas and a plurality of tools for capturing and annotating images. A canvas and tools are shown in FIG. 7.

Preferably, images are captured in an image format that maintains a plurality of layers which are not merged upon saving. Preferably, there are at least two layers, one for a captured image and one for all annotations and edits. More preferably, there are three layers, one for a captured image, one for annotations and one for edits. In either case, the captured image can be extracted for use, for example, as evidence to be introduced in a court.

Preferably, the evidence gathering module implements capture rules for each type of evidence. Capture rules may comprise rules and suggestions for optimally documenting items of evidence. For example, the rules may comprise a minimum number of photos to be taken for a type of evidence, zoom level for a type of evidence, particular required annotations, etc. Suggestions may comprise text prompts to be provided to the investigator to assist the investigator to capture suitable images.

In a specific example, capture rules for documenting an item of evidence comprise capturing a minimum of three photos: a first taken from a wide zoom level showing the item surrounded the crime scene in proximity (including the placard, generally), a second taken at a closer zoom level with a ruler placed alongside the item but partially showing the placard, and a third taken at a close zoom level showing primarily the item and ruler. Suggestions may comprise instructing the investigator to capture the images with sufficient lighting to show marks made upon the casing.

A further capture rule may comprise the capture of at least one photo of a calibration token. For example, in particular jurisdictions a CSI kit may include a rule for capturing a particular color (e.g., an 18% grey ruler), the capture of which can be used to calibrate color settings of the evidence gathering module. Given the capture of such a token by the camera, the evidence gathering module can be calibrated automatically using techniques known in the art. It will be appreciated that the calibration token may enable calibration of characteristics in addition to color, including, for example, physical dimensions, zoom levels, distances, contrast, etc.

The current scene being viewed by the camera is displayed on the canvas until such time as the investigator selects a capture command. Once the capture command (700) is selected, the scene is captured and displayed on the canvas (702). Preferably, the captured scene is shown on a portion of the screen surrounded by white space for annotation. The investigator may then annotate the image initiated by selecting an annotation command (704, 712, 714, 716, 718, 720, 722), save the image and return to the evidence form by selecting a save and return command (706), or add more images of the evidence by adding a new canvas with a corresponding command (708).

Within each canvas, preferably the captured image is uneditable to prevent manipulation of evidence. However, alternatively, the captured image may be editable but an unedited version thereof is saved in addition to the edited image.

The captured image may be zoomed and rotated. Preferably, the canvas enables the investigator to zoom and rotate the captured image using multitouch gestures. For example, touching the captured image in two locations (i.e., using two fingertips) may enable zoom out/in by pinching/spreading the fingertips and rotation by rotating the fingertips relative to each other. Other gestures may also be used, as are known.

Preferably, the captured image can be placed anywhere in the canvas as selected by the investigator. This would enable the investigator to place the captured image along one side of the canvas, for example, leaving the remaining parts of the canvas for annotations.

A command selectable from the canvas launches an editing toolbar (710). The editing toolbar enables the investigator to annotate the image and, optionally, edit the image. Annotations may comprise shapes and text (704). Shapes may, for example, comprise rectangles (718), circles or ovals (716), lines and arrows (712), irregular shapes (722) and free draw (720). Typically, these may be used to highlight a particular portion of the photo that is of particular relevance. Text annotations may be placed at selectable locations of the image. Typically, an investigator will annotate certain features for later reference. For example, an investigator may wish to place a box with explanatory text around a particularly relevant characteristic of a photographed item of evidence (an example of which is shown in FIG. 7 at 724). The editing toolbar may further enable the investigator to undo/redo edits and annotations, erase and modify color/hue/saturation/contrast or perform any other modification as are known in the art.

Prior to proceeding to the next image or back to the evidence form, the investigator may select a capture command to recapture the evidence, for example if the investigator is not satisfied with the photo.

Once the investigator is satisfied with the captured and annotated image, the investigator may select one of a plurality of commands (not shown) for saving the image in connection with the corresponding evidence form. The commands may be selected from the editing toolbar (however, the commands are not shown in the editing toolbar illustrated in FIG. 7) or from a command menu accessible by performing a preconfigured gesture. The commands may comprise: return to evidence form, which saves the image and returns to the evidence form; save to pdf, which completes the case file for the investigator and generates the CoC and PRF as explained below; save to case file, which saves the image but maintains the canvas on the visual output device; return to cases, which saves the image and current case file and enables the investigator to select another case file; and submit (e.g., email) which sends the image to a supervisor or lead investigator or the evidence database.

Optionally, at block 312, a captured and annotated image is sent to the lead investigator and/or supervisor prior to storage in the evidence database. The lead investigator and/or supervisor may then determine if the image is of sufficient quality and contains sufficient information to be stored. The lead investigator and/or supervisor may consequently approve the image in which case it is stored to the evidence database, reject the image (optionally, with comments) in which case the investigator is notified it must be recaptured (in accordance with the commented reasons) or suspend the image (with comments) in which case the investigator is notified that additional photos or annotations should be made in accordance with the comments.

Optionally, the lead investigator and/or supervisor can direct particular investigators to document particular evidence types. For example, the lead investigator and/or supervisor may enable a particular investigator to only document bullet casings by configuring the host device to limit the investigator's client device's selection of evidence type.

Each photo and its corresponding annotated image may be stored to the evidence database. The images may be stored in a proprietary format identifying any combination of the following: coordinates of photo and annotation placement in the canvas; photo width, height and angle of rotation; a string representation of the image used when storing and reloading the case file (generated, for example, by a hash of the image); image identifier; annotation text size, color and font; and edit layer information. Additionally, a scaled down version thereof may be generated and stored to the evidence database. The scaled down versions may be used whenever extensive detail is not required, such as for mapping or quick reference when browsing all evidence, as will be described later.

Optionally, the evidence form further enables the investigator to provide audio or other media using the microphone and using the speaker for playback confirmation.

Figure 8:
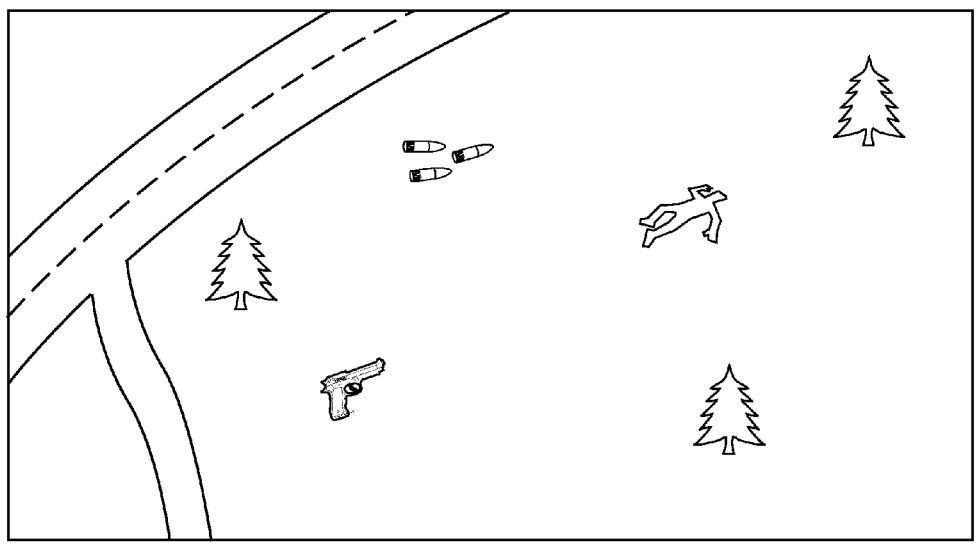
FIG. 8 is an exemplary map.

During gathering of evidence or at the conclusion thereof, an investigator and/or the supervisor may generate a map of the crime scene at block 314. An example of a map is shown in FIG. 8. A map outline may be generated using a canvas and freeform drawing tool. Alternatively, a map may be downloaded from a mapping source, as previously described.

If evidence item locations were input relative to landmarks, the landmarks may be manually identified on the map. Alternatively, the evidence item locations may have been input in absolute terms, in which case there may be no need to identify landmarks. The investigator and/or supervisor may populate the map with evidence items by selecting a map command. A token corresponding to each evidence item for the case is placed upon the map at the location previously provided. Alternatively, each item may be manually placed upon the map by the investigator/supervisor by simply selecting the location by touching the location on the input device and placing a token for the item. The token may be an icon representative of the evidence type (e.g., a generic bullet image to represent a particular bullet) or could be the scaled down version of the actual item's image.

The investigator and/or supervisor can subsequently choose to filter the map to view one or more specific items (hiding others), one or more specific types of evidence, evidence gathered by one or more particular investigators, evidence gathered in a particular time frame, etc. Filters may be applied for any field which contains data.

At the conclusion of each investigator's evidence gathering, they may be in possession of seized evidence. The investigator may be required to close the investigation file, which assigns at block 316 a date and time stamp to the case file for that investigator. Once evidence is submitted it cannot be deleted or modified. However, modifications could be made by submitting a new item and commenting that it is correcting a previously submitted item. Items can be viewed. The evidence gathering module may generate error-checking codes for the investigation file, such as by populating a field indicating how many items of evidence are included in the investigation file, which can be verified when the investigation file is later loaded.

Once each investigator has closed its investigation file, the lead investigator and/or supervisor may review, save and close the case file at block 318. The case file may comprise error-checking codes, such as a field indicating how many items of evidence are included in the case file, which can be verified when the case file is later loaded.

A date and time stamp are assigned to the case file and a CoC form may be generated and saved to a CoC file at block 320. The CoC file may be generated in a secure document format, such as secured PDF. Preferably, the CoC file is assigned a suitable name, such as a name derived from the case title. The CoC file may be stored on the evidence database. Similarly, a property receipt form (PRF), which may also be secure, may be generated at block 322.

Figure 9A:
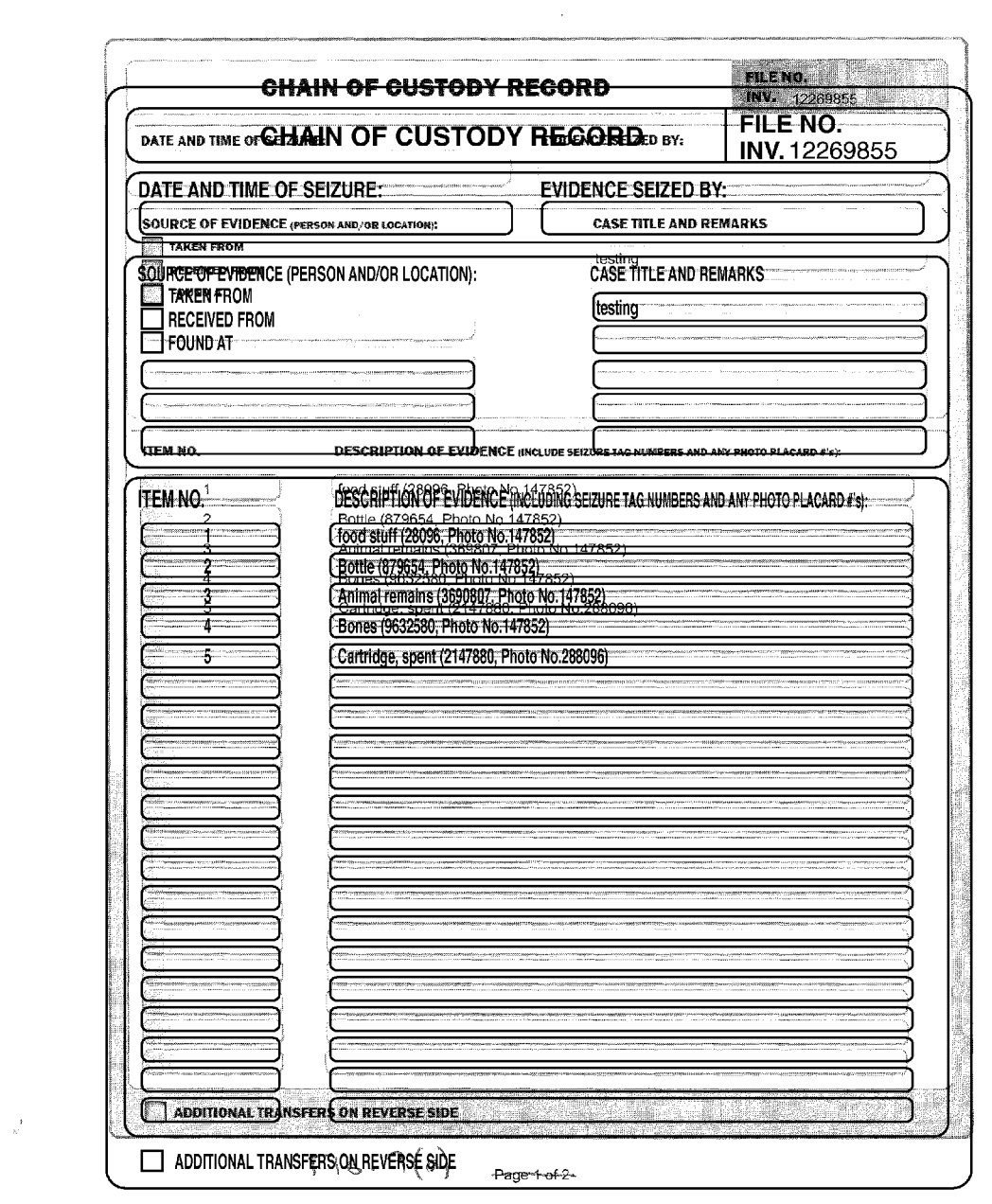
Figure 9B:
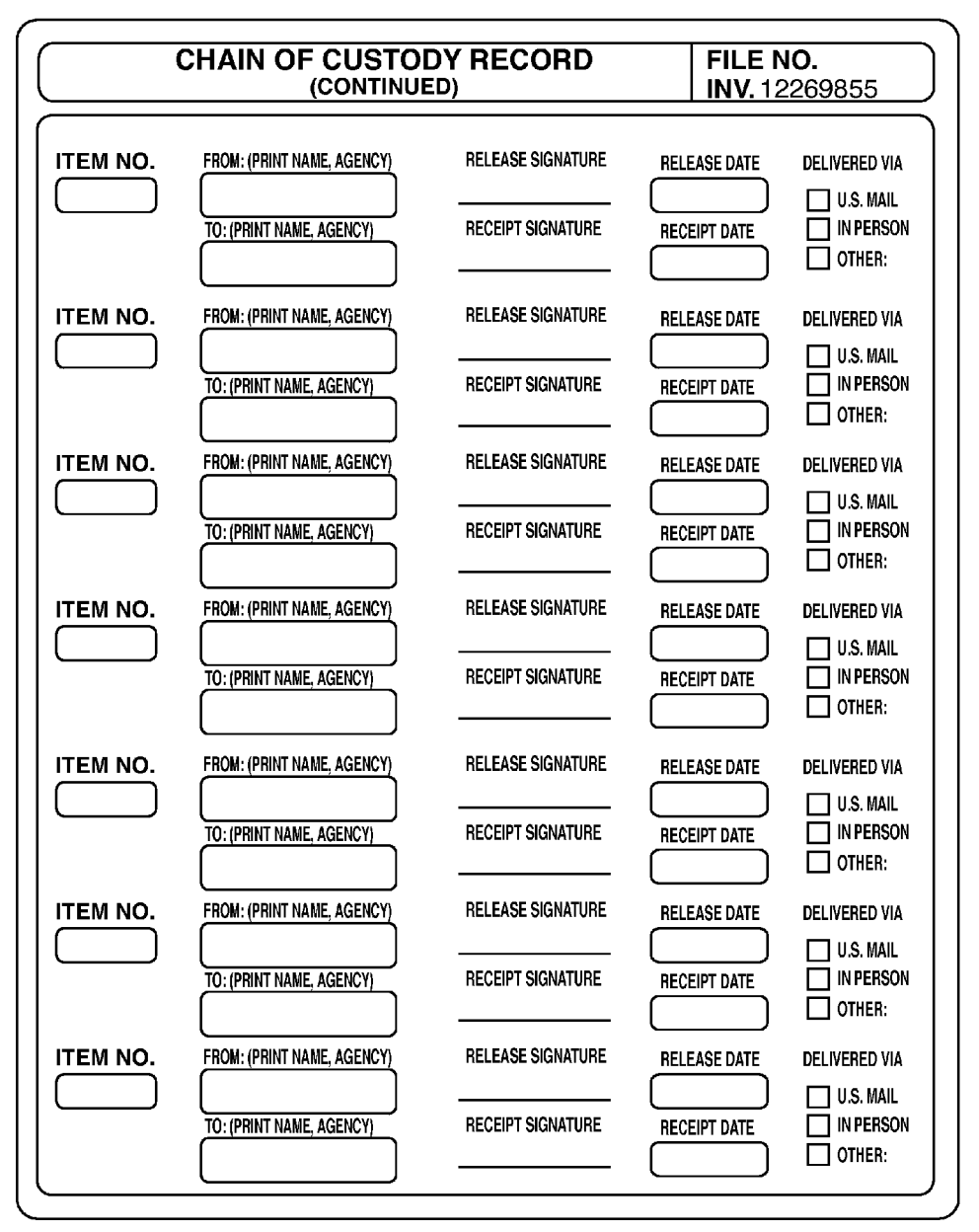

An exemplary CoC form is shown in FIG. 9. The CoC form identifies date and time of seizure; investigator name (or, lead investigator name, or list of all investigators); source of evidence (in the case of crime scene documentation, this field identifies the crime scene location); case title and remarks; and a list of items of evidence. The CoC form can be printed and subsequently used manually to track evidence seizure. Alternatively, the CoC file may be made accessible by the host device or another device enabling users to create revisions (or other copies) of the CoC file identifying seizures of evidence. For example, if the originating CoC form identifies ten items which are then placed in an evidence room, a user wishing to "check out" (seize) one of the ten items could access the CoC form and create a second revision noting that the one item has been seized. Each such revision (or copy) may be linked to the originating CoC form in the evidence database so that evidence seizures can be tracked through the history of an investigation.

The CoC form identifies all evidence items documented and/or seized and identifies which investigator performed the documentation and seizure. The CoC form may further identify the lead investigator, each other investigator and the supervisor. The CoC form comprises a list of each evidence item. Any user may subsequently access the CoC form and select any such item to view all data provided for the item, as described above, including images, location, comments, annotations, which investigator identified the item, seizure tag number, the date/time it was documented, etc.

A corresponding property receipt form (PRF) may also be generated. The PRF provides a complete inventory of all items received/seized by or transferred from the investigator at a specific date, time and place. The PRF may further identify, or enable the later identification of, a witness to the investigator's reception/seizure of the items, attesting to the accuracy and completeness of the inventory. In a specific example, generation of the PRF is suspended while a witness attestation form (not shown) is presented on the client device for obtaining a signature or other authentication from the witness. Alternatively, the PRF may later be witnessed, for example by the witness signing a hardcopy printout of the PRF. An exemplary property receipt form is shown in FIG. 10.

In a further aspect, an analytic engine is provided. The analytic engine may be located on the host device or any client device and may provide information relating to a CSI or enabling an optimal use of resources at a crime scene to be investigated. The analytic engine may provide analytics relating to any of the foregoing data stored on the evidence database.

For example, if a crime scene to be investigated is likely to include toxic materials, tire tracks and bullet casings, a lead investigator can operate the analytic engine to determine which investigators at the crime scene have experience with those particular types of evidence. In an example, investigator A may commonly handle and document bullet casings and is, therefore, a likely candidate to be assigned the task of documenting the bullet casings at the crime scene. Subsequently, the lead investigator can configure her client device to communicate with the host device and back to the candidate's client device to notify the candidate that he is supposed to investigate the bullet casing.

Further analytics may comprise maximums, minimums, averages or any other statistic relating to: time taken to document a crime scene; optimal number of investigators for a particular type of crime scene; common types of evidence found in crimes in particular locations or timeframes; correlations between weather conditions and particular crimes; correspondence between crimes indicative of shared suspects (e.g., tire tracks are the same); and areas of urban centres more prone to certain types of crime.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A multi-user system for managing and coordinating, by a supervising investigator, the documenting, by a plurality of scene investigators of tangible physical evidence located at a remote investigation scene and generating one or more chain of custody forms for the tangible physical evidence, the system comprising a host device comprising a processor and operated by the supervising investigator, a plurality of client devices each comprising a processor and operated by one of the scene investigators and an evidence database:

the host device configured to:
generate a plurality of case files, each case file corresponding to a case for which tangible physical evidence is to be gathered by the plurality of scene investigators;
associate each of the case files with a plurality of scene investigators to permit access to the respective case files by the one or more plurality of scene investigators from the remote investigation scene; and
transmit and receive communications with the plurality of client devices to direct the plurality of scene investigators to document the tangible physical evidence at the remote investigation scene; and
each of the plurality of client devices comprising an evidence gathering module configured to:
permit access from the remote investigation scene to each of the case files to each of the scene investigators associated with the respective case file;
receive from the host device, during the course of evidence gathering, instructions to document tangible physical evidence for the respective case;

present the instructions to the scene investigator operating the client device to enable the scene investigator to appropriately document the tangible physical evidence;

generate, during the course of evidence gathering, the documentation relating to the tangible physical evidence gathered by and in custody of the scene investigator;

during the course of evidence gathering and prior to generation of a chain of custody form, communicate the documentation relating to the tangible physical evidence to the host device for approval by the supervising investigator; and upon the supervising investigator approving the gathered documentation of the tangible physical evidence:

generating at least one chain of custody form, each said form identifying the documentation, the tangible physical evidence and the scene investigator in possession of one of said documented items of the tangible physical evidence;

communicating the documentation relating to the tangible physical evidence and the chain of custody forms to the host device for storage in the evidence database; and notifying the scene investigator in custody of the tangible physical evidence of the sufficiency of the documentation and to secure and maintain the custody of the tangible physical evidence; and upon the supervising investigator not approving the documentation of the tangible physical evidence, communicating with the client device to instruct the scene investigator operating that client device to generate further documentation at the remote investigation scene relating to the tangible physical evidence, prior to generating the chain of custody forms for corresponding ones of the documented items of tangible physical evidence.

2. The system of claim 1, wherein the documentation comprises an image of each item of evidence.

3. The system of claim 2, wherein the evidence gathering module further enables the scene investigator to annotate each image.

4. The system of claim 2, wherein the evidence gathering module further enables the scene investigator to edit each image while retaining the captured image.

5. The system of claim 1, wherein the evidence gathering module generates a first time stamp corresponding to commencement of documentation and a second time stamp corresponding to conclusion of documentation, the chain of custody form being generated to include the first time stamp and second time stamp.

6. The system of claim 1, wherein the evidence gathering module obtains environmental conditions during the documentation, the chain of custody form being generated to include the environmental conditions.

7. The system of claim 1, wherein the host device enables a supervisor to review and modify the documentation prior to storage on the evidence database.

8. The system of claim 1, wherein the scene investigator identifies, for each item of evidence, an evidence type, each evidence type being associated with preconfigured instructional information.

9. The system of claim 8, wherein the evidence gathering module is operable to generate and display a notification using the instructional information.

10. The system of claim 1, wherein the host device enables the supervising investigator to direct a plurality of the scene investigators to each document particular items of evidence for the case.

11. The system of claim 1, wherein the documentation comprises a location for the item of evidence.

12. The system of claim 11, wherein the evidence gathering module is operable to generate a map in which one or more tokens are displayed corresponding to the locations for each item of evidence.

13. The system of claim 1, wherein the evidence gathering module is linked to an analytic engine to provide analytics relating to the documentation of evidence.

14. The system of claim 1, wherein the chain of custody form is a secured document.

15. A method for managing and coordinating, by a supervising investigator, the documenting, by a plurality of scene investigators of tangible physical evidence located at a remote investigation scene and generating one or more chain of custody forms for the tangible physical evidence, the method comprising:

configuring a host device to be operated by the supervising investigator to:

generate, by one or more processors, a plurality of case files, each case file corresponding to a case for which tangible physical evidence is to be gathered;

associate each of the case files with a plurality of scene investigators to permit access to the respective case files by the plurality of scene investigators from the remote investigation scene; and transmit and receive communications with the plurality of client devices to direct the plurality of scene investigators to document the tangible physical evidence at the remote investigation scene; and configuring each of the plurality of client devices comprising an evidence gathering module to be operated by one of the scene investigators to:

permit access from the remote investigation scene to each of the case files to each of the plurality of scene investigators associated with the respective case file;

receive from the host device, during the course of evidence gathering, instructions to document tangible physical evidence for the respective case;

present the instructions to the scene investigator operating the client device to enable the scene investigator to appropriately document the tangible physical evidence;

generate, during the course of evidence gathering, the documentation relating to the tangible physical evidence gathered by and in custody of the scene investigator;

during the course of evidence gathering and prior to generation of a chain of custody form, communicate the documentation relating to the tangible physical evidence to the host device for approval by the supervising investigator; and upon the supervising investigator approving the gathered documentation of the tangible physical evidence:

generating at least one chain of custody form, each said form identifying the documentation, the tangible physical evidence and the scene investigator in possession of one of said documented items of the tangible physical evidence;

communicating the documentation relating to the tangible physical evidence and the chain of custody forms to the host device for storage in the evidence database; and notifying the scene investigator in custody of the tangible physical evidence of the sufficiency of the documentation and to secure and maintain the custody of the tangible physical evidence; and upon the supervising investigator not approving the documentation of the tangible physical evidence, communicating with the client device to instruct the scene investigator operating that client device to generate further documentation at the remote investigation scene relating to the tangible physical evidence, prior to generating the chain of custody forms for corresponding ones of the documented items of tangible physical evidence.

16. The method of claim 15, wherein the documentation comprises an image of each item of evidence.

17. The method of claim 16, further enabling the scene investigator to annotate each image.

18. The method of claim 16, further enabling the scene investigator to edit each image while retaining the captured image.

19. The method of claim 15, further comprising enabling the generation of a first time stamp corresponding to commencement of documentation and a second time stamp corresponding to conclusion of documentation, the chain of custody form being generated to include the first time stamp and second time stamp.

20. The method of claim 15, further comprising enabling the processor to obtain environmental conditions during the documentation, the chain of custody form being generated to include the environmental conditions.

21. The method of claim 15, further comprising enabling a supervisor to review and modify the documentation prior to storage on the evidence database.

22. The method of claim 15, wherein the scene investigator identifies, for each item of evidence, an evidence type, each evidence type being associated with preconfigured instructional information.

23. The method of claim 22, further comprising generating and displaying a notification using the instructional information.

24. The method of claim 15, wherein the host device enables the supervising investigator to direct a plurality of the scene investigators to each document particular items of evidence for the case.

25. The method of claim 15, wherein the documentation comprises a location for the item of evidence.

26. The method of claim 25, further comprising generating a map in which one or more tokens are displayed corresponding to the locations for each item of evidence.

27. The method of claim 15, further comprising providing an analytic engine to provide analytics relating to the documentation of evidence.

28. The method of claim 15, wherein the chain of custody form is a secured document.

* * * * *